HERMANN BEYER
GUNTER SCHOPPE
INVENTOR

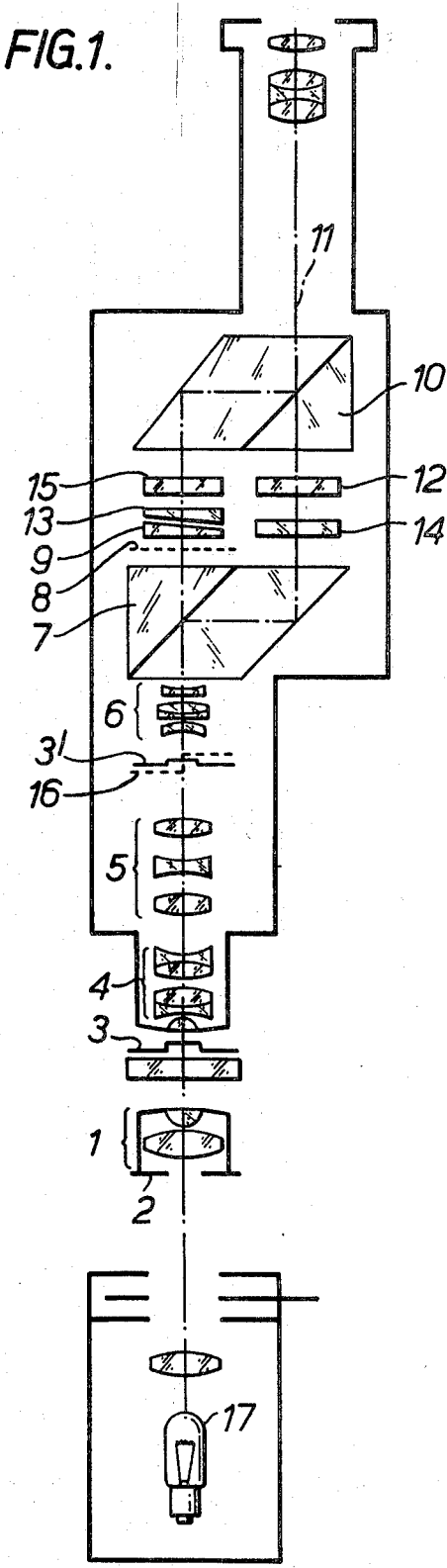

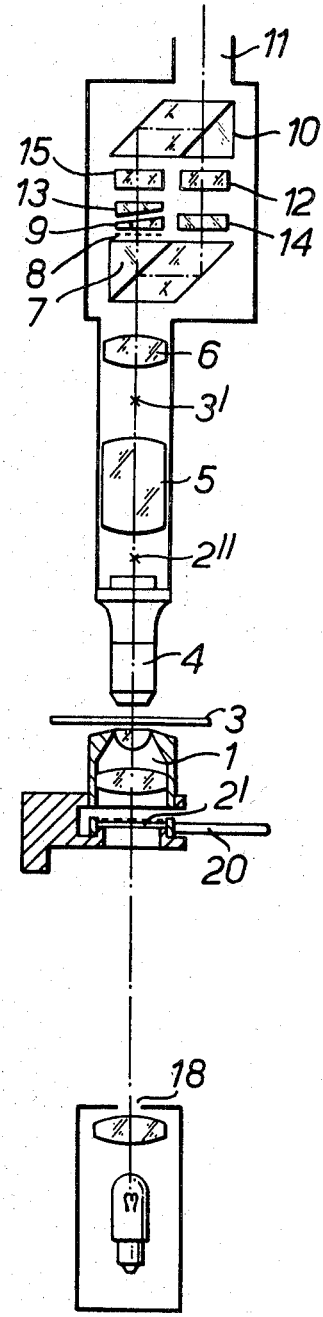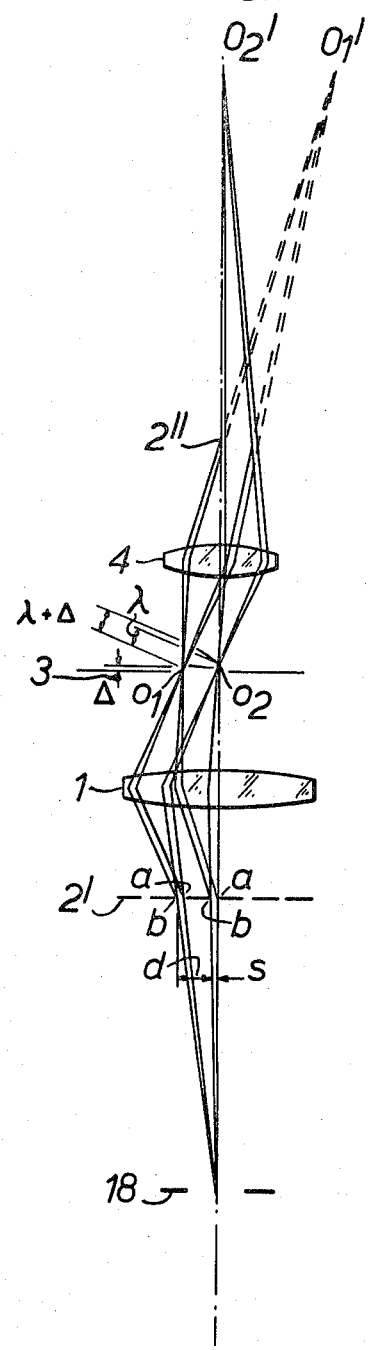

BY
Nolte & Nolte
ATTORNEY

United States Patent Office 3,563,629
Patented Feb. 16, 1971

3,563,629
DEVICE FOR MEASURING PATH DIFFERENCES ON OBJECTS
Hermann Beyer and Gunter Schoppe, Jena, Germany, assignors to Jenaoptik Jena G.m.b.H., Jena, Germany
Continuation-in-part of application Ser. No. 566,292, July 19, 1966. This application June 27, 1969, Ser. No. 843,905
Int. Cl. G02b 21/14
U.S. Cl. 350—13                        4 Claims

ABSTRACT OF THE DISCLOSURE

The illumination aperture of a splitting interferometer operating with a monochromatic light is increased and the subsequent condenser focus plane is equipped with interchangeable gratings having a plurality of slits.

---

This application is a continuation-in-part of copending application Ser. No. 566,292, filed July 19, 1966.

This invention relates generally to instruments for measuring path differences on objects, particularly phase objects, illuminated by transmitted or incident light.

Good contrast in the representation and for the measurement of phase objects is obtained in phase-contrast and interference microscopy.

The phase-contrast method introduced by Zernike is intended particularly for use in the observation of small phase objects, whereas the various known methods of interference microscopy are more useful for good contrast representation of large-area phase objects and measuring path differences thereon.

While the phase-contrast method produces contrasts by different influences, such as change of relative phase shift and transmittance between direct light and light diffracted on the observed object, the various interference methods superpose the normal bright-field image on a coherent background, which may be structureless or may likewise have object structures. Optimal contrast formation can be produced, and relative path differences of phase objects found, by measurably changing the phase difference between the bright-field image and the background. In dependency on the adjustments of the two partial ray paths relative to each other, the field of view either shows interference fringes or a homogeneous field in which the image of the object produces a contrast.

In commercial interference microscopes the structureless coherent background is obtained by splitting the ray path on the illumination side in such a way that the comparison ray does not traverse the object. This method, though satisfactory theoretically, leads to difficulties in adjustment as well as in regard of mechanical and thermal stability, since relatively great lengths of the two partial beams have to traverse different optical elements. A satisfactory realization of that principle is however very expensive.

Some recent methods of interference microscopy dispense with the two separate ray paths and split the image by polarization optical auxiliary means, a partial superposition of image structures being subsequently substituted. However, the use of polarized light in measuring polarization objects gives rise to difficulties and, moreover, the illumination aperture must in general be considerably restricted even if the contrast diminishing phase differences in the objective aperture are partially compensated. The amount of the image split has always been fixedly predetermined by the design of the double refracting elements. On the other hand, the difficulties with respect to adjustment and stability are comparatively small, since the two beams pass through the same optical elements and are only slightly displaced relatively to each other.

It is an object of the invention to provide an instrument for measuring path differences on microscopic objects, particularly phase objects, which operates equally well with transmitted and incident light and very largely obviates the disadvantages inherent in known interference-microscopic instruments.

Another object of the present invention is to provide a device for shearing interferometers operating with monochromatic light which will improve the resolving power quality and the image brightness of the interferometer.

To this end, the present invention consists in providing an instrument for exact phase measurements on microscopic objects by means of a Mach-Zehnder interferometer disposed near the exit pupil of the objective or near an image of same, characterized by the exclusive use of non-polarizing elements which are fitted to the peculiarities of the object as to size and phase shift and include either glass prisms of variable effect which are preferably transparent, or diaphragms coupled to the aperture diaphragm.

The invention will be more clearly understood from the following description of a specific embodiment thereof together with the accompanying drawings, wherein:

FIG. 1 shows schematically the shearing Mach-Zehnder-type interferometer for measuring phase differences on microscopic objects;

FIG. 2 is a modification of the device of FIG. 1 having interchangeable grating in the condenser focus plane;

FIG. 3 shows the paths of light rays when passing through the lower section of the device of FIG. 2;

Figure 4:
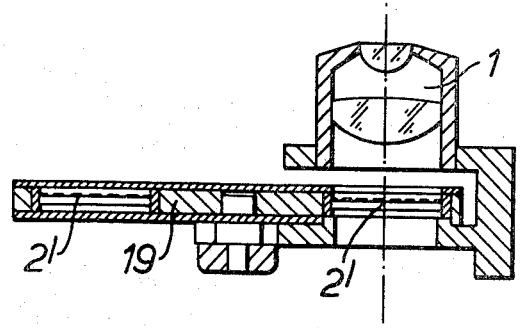
FIG. 4 is a detailed side view of a grating turret.

In FIG. 1 the illustrated embodiment comprises a light source 17, a luminous field stop 18, a slit or annular diaphragm 2 receiving light from the light source, condenser 1 behind the diaphragm, the object plane 3 and an objective 4 behind the object plane. Beyond and in series with these elements an intermediate projection system is arranged comprising lens groups 5 and 6 which the slit or annular diaphragm is imaged in a plane 8. Plane 8 is situated behind a splitting prism 7, and in front or inside of a transparent optical glass prism in combination 9, 13 which is interposed in or near one of the two objective exit pupils in the interferometer, or in a respective image thereof.

The transparent optical glass prism in combination 9, 13 may be replaced by an annular diaphragm, which in contrast to prism in combination 9, 13 does not split the image.

The deflection effect of the transparent prism in combination 9, 13 is variable and is disposed on a rotating device (not shown). The axis of rotation of this device and the optical axis of the instrument are offset with respect to the symmetrical plane of prisms 9, 13 which also contains the edge of the prism. It is thus possible to change the amount and the direction of the image split continuously.

Prism 7 splits the beam into two partial beams, which are reunited in a prism 10. Prisms 7 and 10, together form Mach-Zehnder interferometer having two light exits, but only one (11) is used. The intermediate image of the object plane 3, which appears in the rear of the prism 10, can be observed through a monocular or binocular tube (not shown). The phase difference of the partial beams in said interferometer can be measurably varied by means of a phase shifter 12, so that the field changes in brightness or, in the case of white light, in color. A phase object in object plane 3 causes a deformation of the wave surface. The both wave surfaces produced by the interferometer are superposed on each other in the intermediate image without the appearance of any contrasts since the two wave surfaces are equal and not laterally displaced to each other.

An image splitting will take place however if a glass prism like the prism 9 or 13 of small prism angle is interposed at the locus of the image slit 2, this diaphragm splitting being already known from polarization-optical interference instruments. Accordingly, there is an interference of one detail of the object in the one wave surface with the part in the other wave surface near the object. By means of the phase shifter 12, one of these object details and its surroundings are successively darkened interferentially as much as possible. The difference between the two respective adjustments is the object phase shift. A glass plate 14 and a glass prism 15 compensate the paths through the glass of the prisms 9 and 13, and phase shifter 12.

An exact phase measuring even with great path differences may be effected with the aid of a phase shifter 12 in the interferometer. The phase shifter 12 consists preferably of an adjustable transparent prism like the prism 9 or of a combination of at least two such transparent prisms 9. The arrangement is such that the phase shifter 12, or a conjugated plate or such a prism are rotatable either individually or in combination about an axis offset from the optical axis of the instrument. The interferometer may be provided with additional transparent stationary or displaceable plates or prisms similar to the prism 9 for compensating the optical path lengths of the two partial beams. Due to the fact that all optically effective elements in the illumination part and in the interferometer are exchangeable, the instrument is available for various fields of interference microscopy.

If a semi-reflecting means is interposed in the illumination ray path, the instrument may be universally used for simultaneously or successively operating with different kinds of light tuned relatively to each other. However, in examining double reflecting objects it is also expedient to provide polarizers and compensators, which are to be interposed in both the illumination side and the image side of the instrument.

The prism angle of the prism system 9 and 13 can be made so small that the object splitting is within the order of the amount of the resolving power limit of the objective, in which case objects with continuous phase changes produce a high relief-effect, so that the total phase change is not shown, but only the gradient of this change or that of the index of refraction. The image is similar to an electron microscopic image of a specimen obliquely vapoured. Rotating glass prism 15 which has a small wedge angle and phase shifter 12 in opposite direction with respect to each other about axes not parallel to the optical axis causes a split of both the image and the exit pupil. In this way it is possible to produce interference fringes in the image plane. The spacing of the interference fringes in the image plane is inversely proportional to the aperture split. Simultaneous image splitting causes a fringe shift, which is due to the relative object phase shift. This shift, which can be advantageously used particularly in measuring very great path differences, is directly measurable in the eyepiece or by means of the phase shifter 12. However, by rotating the prisms 9 and 13 in opposite directions about an axis not parallel to the axis of prism 15, the image split can be cancelled entirely or partly. The amount of the split of the exit pupil can accordingly be chosen independently of the split of the object. Optimum contrast results if the slit diaphragm 2 is at right angles to the direction of the image split. It is therefore advantageous to make the diaphragm rotatable about an axis which is offset from the optical axis of the instrument.

For illumination with entirely monochromatic or nearly monochromatic light it is possible to increase the intensity and the image quality by changing the slit in the illumination ray path for a grating (FIGS. 2 to 5) which enlarges the illumination aperture and has slit spacings conforming to the amount of split of the object image.

Where small objects are concerned, it is advisable to replace the slit diaphragm 2 by a diaphragm of the kind usual in phase-contrast observations, and the prism system 9 and 13 by an annular diaphragm conjugated to this latter diaphragm.

This variant of the instrument is particularly suitable for measuring relative phase shifts of small phase objects. For this purpose, an exchangeable annular diaphragm 2 may be placed on the illumination side of the instrument and another exchangeable diaphragm may be interposed near one of the two objective exit pupils in the interferometer. With this arrangement, the exit pupil is conjugated to and cooperating with the diaphragm on the illumination side of the instrument. The direct light after traversing the conjugated diaphragm thus forms a homogeneous comparison wave and provides a contrasting representation of the phase object. To achieve the best results, the diaphragms form two concentric annuli of different diameter and width, whereby the broad annulus is screened at option in the illumination part.

If the object is sufficiently small and the annular diaphgram sufficiently narrow, the light diffracted on the object is blocked almost entirely in the one partial beam path by an annular diaphragm, which replaces the prism system 9 and 13, whereas in the other partial-beam path both the direct light and the light diffracted on the object are effective.

As direct light alone, cannot produce any images of structures, a coherent homogeneous background is superposed on the bright-field image in the image plane in due regard to phase. By means of the phase shifter 12, the relative phase between both beams can be optionally varied within wide limits; and it is feasible by interference to cause both the object and its environment successively to appear in different brightnesses or colors. The relative phase shift of the object can be measured by adjustment to the greatest possible darkness of the object and its surroundings. The measuring accuracy can generally be increased by means of a half-shadow plate 16, one of the phase edges being so arranged as to lie in object image 3' and the equality of brightness on either side of the edge being used as a criterion for the adjustment. The half-shadow method can also be used when the image is split.

This method of interference microscopy without lateral image splitting involves certain restrictions as to object size and annular width. The criterion of how far such restrictive conditions are fulfilled may be expressed by the parameter value $$\Gamma = \frac{B \cdot K}{f} \Delta R$$

wherein
B is the radius of a circular object, $$K = \frac{2\pi}{\lambda} \text{ is the wave number}$$

$\Delta R$ is the width of the diaphragm annulus in the interferometer, and
$f$ is the focal length effective for imaging the annular diaphragm.

The magnitude necessary for said parameter value depends on the object-phase shift and the desired accuracy of measurement. The arising errors are in any case negligible if $\Gamma$ is not greater than 1. The accuracy will still be satisfactory if $\Gamma < 2.5$.

The advantage of this method over the methods referred to hereinbefore consists in that there need be no image split, and that without the necessity of restricting the objective aperture, the illumination aperture requires no greater restriction than it does in the phase-contrast method, moreover only an object plane part in the direct neighborhood of the object need be used for measurement, that furthermore no particularly high demands are made on the object slide and the cover glass, and the operation and the centering for the annular diaphragms present no more difficulty than they do in the phase-contrast method, the outcome being good image quality and comparatively easy measuring.

For measuring path differences on large faced objects without inhomogeneities, for instance, for defining the thickness of evaporation layers or supporting foils for the electronic microscopy, prisms 9 and 13 may be replaced by a suitable support on which the object to be measured is mounted so that the compensations for existing differences of the optical paths between the two partial beams may be measured by means of a measuring wedge. The measuring is carried out in series, and with an object in one of the partial beam paths. In this way, the optical thickness of the object is directly measured.

In conclusion it may be said that, the instrument according to the present invention has the following advantages: It avoids polarized light. After splitting the imaging ray into two partial beams and separately influencing and then reuniting these partial beams it causes the appearance of two partial images and makes these images interfere with each other either without a lateral split or with a differential lateral split, or with a total lateral split. By differently inclining the two partial beams relatively to each other, interference fringes with different fringe spacings or interference contrasts can be produced in the field of view independently of the split of the object. The phase difference between two partial beams can be measurably changed, which means that exact measurement of path differences are possible also on small phase objects.

FIG. 2 shows a variation of the device of FIG. 1, in which split diaphragm 2 in the form of exchangeable grating 2' is provided in the focus plane of condenser 1. FIG. 3 illustrates paths of light beams passing through respective optical elements between the field stop—and image planes. Grating 2' is optically projected through condenser 1 into infinity whereas the luminous field stop 18 is projected on object plane 3. The luminous field stop 18 together with the object in object plane 3 are projected through objective 4 and lens system 5 onto object image plane 3' and, subsequently, through the optical system, as described before with reference to FIG. 1, onto a plane behind the light exit 11. Grating 2', on the other hand, is projected through objective 4 onto the rear focus plane 2'' and, therefrom, through lens systems 5 and 6 onto plane 8 behind the splitting prism 7. Similarly as in FIG. 1, the combination of two prisms 7 and 10 with optical wedges and plates 9, 12, 13, 14 and 15 is a modified Mach-Zehnder interferometer. By adjusting the mutual position of wedges 9 and 13, it is possible to shift laterally at exit 11 the image path through optical elements 9, 13 and 15, relative to the image path through optical plates 12 and 14. At a shift at which the image path through elements 9, 13 and 15 appears deviated in plane 8, interference fringes occur in the plane 8 and become narrower as the splitting or shifting at the image increases. As marked by arrow in FIG. 3, the image point $O_1'$ of the imaged object $O_1$ will appear in a plane behind the exit 11 in coincidence with the image point $O_2'$ of the imaged object $O_2$. Provided that the images of slits of grating 2' correspond with the spacings between respective interference fringes, there will result a resonant condition for the monochromatic light at which the interference effect is produced and, consequently, sharply contrast interference phenomena will occur. This process will be explained in more detail with reference to FIG. 3 illustrating the paths of light from the luminous field stop 18 to the rear focus plane 2'. In the latter plane the shift of light beams $a$ and $b$ imaging the point $O_1$ to the point $O_1'$ can also be accomplished by means of optical wedges to attain coincidence with the light path imaging point $O_2$ to point $O_2'$. Grating 2' which is arranged in the focus plane of condenser 1 has a number of slits $s$. Light rays $a$ and $b$ emerging from the edges in each slit determine a group of parallel light beams which in dependence of the width of slit $s$ become more or less inclined one to another when being projected on object plane 3. Since the light wave fronts of the beams are perpendicular to the direction of their propagation, the wave fronts of marginal light rays $a$ and $b$ between the image points $O_1$ and $O_2$ have the same relative inclinations one to another as the inclinations between the marginal rays. As a consequence, definite phase differences $\Delta$ among the wave fronts between the image points $O_1$ and $O_2$ will result. All remaining intermediate image points at the illuminated slit produce phase differences lying between zero and $\Delta$. Provided that the phase differences lie in the interval between O and $\lambda/4$—where $\lambda$ is the wave length of a monochromatic light—then sharp interference phenomena will occur, since only under the $\lambda/4$ condition are all of the interfering rays superimposed in nearly the same sense.

In dependence of the additional phase difference which has been introduced to the magnitude $\Delta$ by the observed object, rays $a$ and $b$ at the point $O_1'$ amplify or attenuate each other due to the interference.

An undisturbed interference will take place even if the slits emloyed in the grating 2' cause between the image points $O_1$ and $O_2$ phase—or path differences—ranging from $\lambda$ to $1\frac{1}{4}\lambda$ or, generally from $n\lambda$ to $(n+\frac{1}{4})\lambda$, where $n$ is an integer. The reason for this fact is that for monochromatic light the interference phenomena arising from various phase—or path differences—due to different $n\lambda$, cannot be distinguished.

For the same reason when employing an approximately monochromatic light passing through grating 2' having a plurality of slits, it becomes possible to increase the luminous field aperture and thus to improve the brightness and quality of the image without disturbing the interference, A precise analysis shows that when fulfilling the above condition the distance of the diffraction images of the luminous field stop aperture caused by the grating corresponds exactly with the image split produced by the interferometer. However, the ratio of the width of the slit $s$ to the grating constant $d$ must be $\leq \frac{1}{4}$.

In order to insure the condition for attaining different magnitudes of the image split and fully utilize the advantage of a continuous adjustment thereof, the condenser focus plane is provided with a number of interchangeable gratings having different grating constants $d$.

Figure 5:
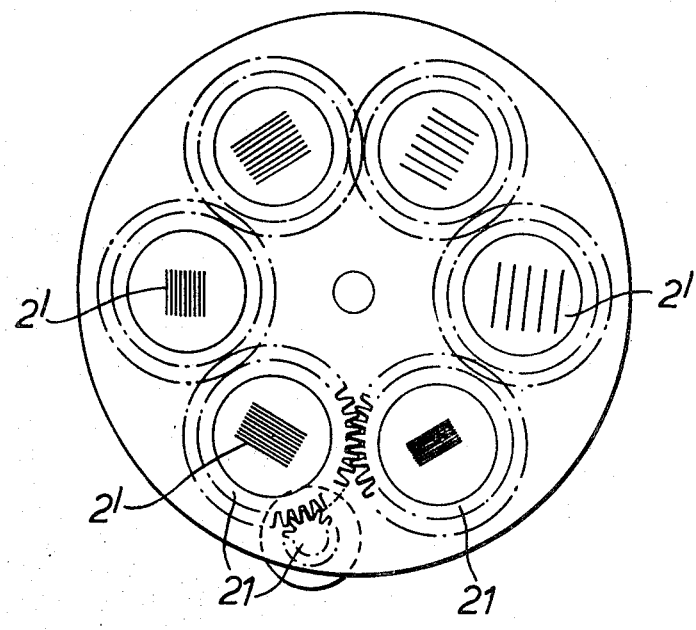
FIG. 5 is a plan view of FIG. 4.

An example of such arrangement is shown in FIGS. 4 and 5. A turret plate 19 supports at its peripheral area a number of gratings 2'. Each of the gratings has a plurality of uniform slits which have different width at respective gratings. The turret plate 19 is rotatably arranged at the focal plane below condenser 1 so that the gratings may be readily exchanged by rotating the turret.

To adjust the direction of the grating with respect to the direction of the image split at the exit of the interferometer, i.e. to set the grating gaps perpendicularly to the direction of the image shift, the gratings are mounted on rotatable disks geared at their periphery one to another. The angular position thereof is adjusted either by means of control gear 21 (FIG. 5) or by lever 20 (FIG. 2).

What is claimed is:

1. In a splitting interferometer for exact phase measurement on microscopic phase objects, a combination for improving brightness and quality of the observed image without disturbing the interference, comprising a source of light for transmitting light beams of limited spectral range on an optical path, and, consecutively arranged on said optical paths, a luminous field stop, condenser means having condenser focus plane, object plane adapted for receiving the phase object to be observed, objective means having objective focus plane, object image plane, means for splitting the image behind the object image plane, means for varying phase shifts of the split image to produce interference fringes, and grating means disposed in said condenser focus plane and having a plurality of slits adjusted to the split of said image.

2. The combination as claimed in claim 1, wherein said grating means is exchangeably arranged in said condenser focus plane.

3. The combination as claimed in claim 2, further comprising rotatable support means for supporting a number of said gratings, each of said gratings having fixed slit spacings which conform to various amounts of split of said image.

4. The combination as claimed in claim 3 wherein respective gratings are rotatably arranged in said rotatable support means for adjusting angular position of said slits to the split of said image.

References Cited

UNITED STATES PATENTS

| | | | |
|---|---|---|---|
| 2,685,228 | 8/1954 | Kavanaugh | 350—13 |
| 2,699,092 | 1/1955 | Rantsch | 350—13 |
| 2,770,166 | 11/1956 | Gabor | 350—12 |
| 2,924,142 | 2/1960 | Normaski | 350—13 |

OTHER REFERENCES

Beyer et al.: "Interference Equipment for Transmitted-Light Microscopy," Jena Review, QC, 350 J4, pp. 99–104.

DAVID SCHONBERG, Primary Examiner

P. R. MILLER, Assistant Examiner